United States Patent [19]

Perusse

[11] 3,999,929
[45] Dec. 28, 1976

[54] APPARATUS FOR FEEDING CORE MATERIAL

[75] Inventor: Norman J. Perusse, Farmington, Conn.

[73] Assignee: The Wiremold Company, West Hartford, Conn.

[22] Filed: Nov. 13, 1974

[21] Appl. No.: 523,213

[52] U.S. Cl. .............................. 425/392; 138/122; 264/173; 285/179; 425/DIG. 122
[51] Int. Cl.² .................... B29B 5/04; B29D 23/10
[58] Field of Search ......... 425/122, 515, 518, 383, 425/392, 446, DIG. 122; 285/179, 235; 156/166, 294, 461, 466; 138/122, 124, 125, 128, 155; 264/173

[56] References Cited

UNITED STATES PATENTS

| 561,441 | 6/1896 | Schmidt | 285/179 X |
|---|---|---|---|
| 2,243,356 | 5/1941 | Olson | 285/235 X |
| 2,645,590 | 7/1953 | Mildner et al. | 156/294 X |
| 2,963,750 | 12/1960 | Paulic | 156/294 X |
| 3,118,800 | 1/1964 | Snelling | 264/173 X |
| 3,950,213 | 4/1976 | Rejeski et al. | 156/461 |

*Primary Examiner*—Leonidas Vlachos
*Assistant Examiner*—Z. R. Bilinsky
*Attorney, Agent, or Firm*—Prutzman, Hayes, Kalb & Chilton

[57] ABSTRACT

The discharge device of this invention serves to receive axially compressed radially self-sustaining tubular duct in a cartridge form substantially shorter than the fully extended length of the duct and has a restraining collar on an exit end of the discharge device which effects a hoop tension on the compressed core during its passage from the exit end of the device to apply a controlled frictional drag ensuring that the core upon discharge is in a fully extended condition.

4 Claims, 3 Drawing Figures

U.S. Patent   Dec. 28, 1976   Sheet 2 of 2   3,999,929
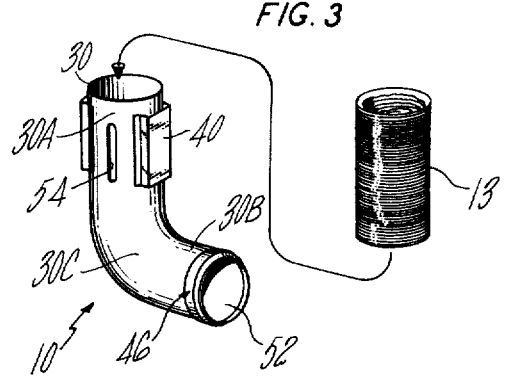
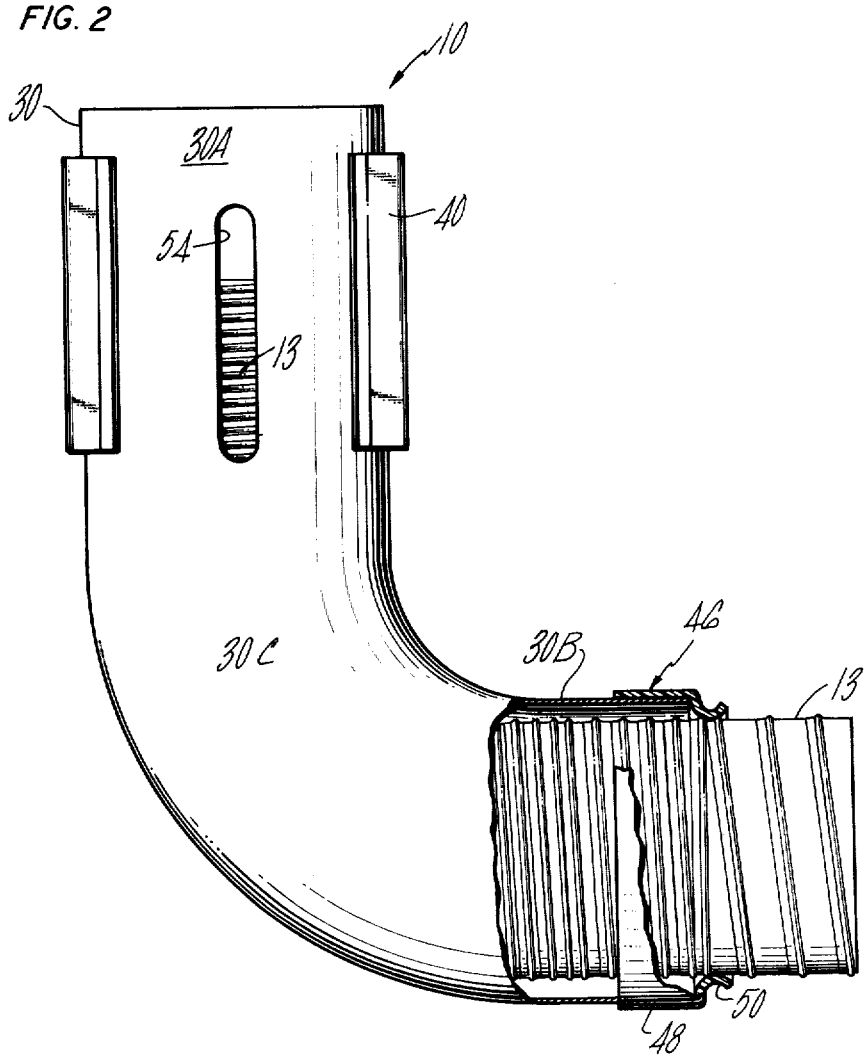

APPARATUS FOR FEEDING CORE MATERIAL

This invention generally relates to tubular duct making machines of a type disclosed in United States patent application Ser. No. 521,657 entitled "Machine for Manufacturing Insulated Duct" filed Nov. 7, 1974 in the names of William E. Rejeski and Norman J. Perusse and assigned to the assignee of this invention. More particularly, this invention concerns a device usable with the machine of the referenced application for feeding core material into a duct forming part of the machine.

A primary object of this invention is to provide a new and improved discharge device for feeding axially compressible, radially self-sustaining tubular core material into an associated machine for making flexible tubular insulated duct having an outer wrap or wraps formed about the inside core.

Another object of this invention is to provide a device of the above described type which is of a simplified compact construction particularly suited to receive the core material in an axially compressed cartridge form for discharging it in a fully extended length into the associated machine.

Other objects will be in part obvious and in part pointed out more in detail hereinafter.

A better understanding of this invention will be obtained from the following detailed description and the accompanying drawings of an illustrative application of this invention.

In the drawings:

FIG. 2 is an enlarged side elevational view, partly broken away and partly in section, showing the device of this invention; and FIG. 3 is a reduced isometric view showing the device of FIG. 2 and a length of tubular core in longitudinally compressed cartridge form to be loaded into the discharge device.

Figure 1:
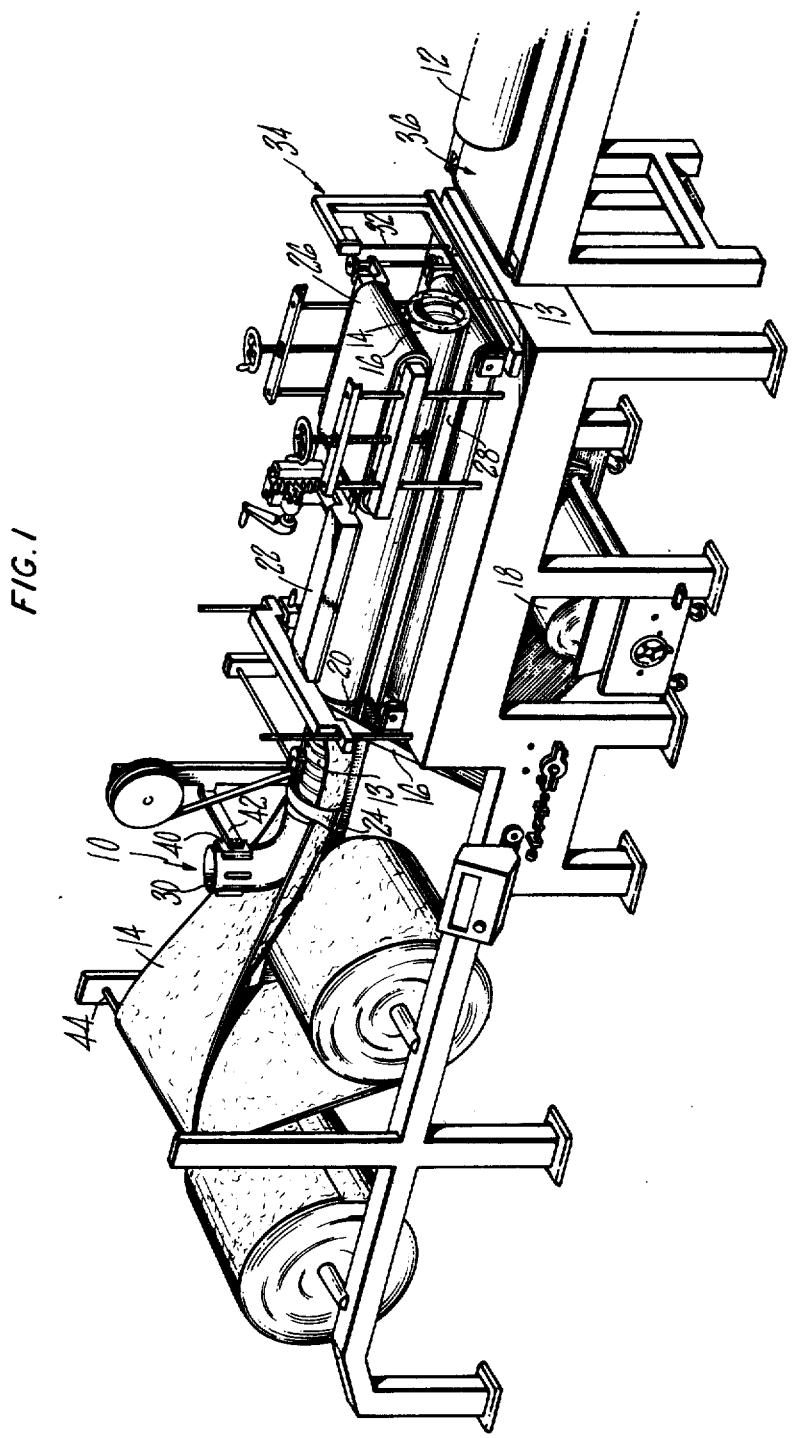
FIG. 1 is a perspective view schematically showing a duct making machine with which the discharge device of this invention may be used.

Referring to the drawings in detail, a discharge device 10 is shown for receiving and feeding a central core 13 to the machine 10 for making tubular flexible insulating duct 12. The duct 12 is of an elongated type fully described and shown in United States patent application Ser. No. 515,055 of William E. Rejeski, filed Oct. 15, 1974 and entitled "Method of Forming a Tubular Joint and the Product Formed Thereby" and assigned to the assignee of this invention, the subject matter of which is incorporated herein by reference.

As described in this referenced patent application, the duct 12 is of a tubular type having multiple layers which include the central core 13 having, e.g., a helical reinforcing wire covered by a fabric, and a surrounding insulating material such as fiber glass wool 14 which is covered by an appropriate thin film material such as polyester or other suitable imperforate plastic or paper material, e.g., to provide an outer casing 16 serving as a vapor barrier.

The duct 12 is formed into tubular shape of a continuous length and may be cut to a desired predetermined length. The machine shown in FIG. 1 serves to make the duct 12 and is fully illustrated and described in the first referenced Rejeski et al patent application Ser. No. 521,657. As best seen in FIG. 1, the outer vapor barrier casing 16 is drawn from a roll 18 directly about a sheet forming collar or so-called "sailor's" collar 20 adjacent a heat sealer 22. The sailor's collar 20 acts to continuously form the casing 16 into a tubular configuration as the casing 16 is drawn over the outside surface of the collar 20 and then inverted over the lip of the sailor's collar 20 as the film casing 16 is drawn into the machine along the inside surface of collar 20. Collar 20 will be understood to be split longitudinally along its uppermost arcuate surface. Longitudinally extending opposed free edges of the casing 16 are formed to project upwardly for passage through the split part of collar 20 and into the heat sealer 22 to be formed into a longitudinally extending joint for securing the outer wrap of the duct 12, It is to be understood that the heat sealer 22 has suitable drive means, not shown, for engaging and driving the opposed longitudinally extending free edges of the casing 16. The heat sealer drive means assists cooperating upper and lower power operated belt conveyors 26 and 28 in drawing the insulation 14 and core 13 into the machine to be formed into tubular duct upon the free edges of the surrounding casing 16 being formed within the heat sealer 22 into the longitudinally extending joint along the uppermost surface of the duct. As fully described in the referenced Rejeski et al patent application, Ser. No. 521,657, the insulation 14 is drawn through an upstream sheet forming station or so-called "horse's" collar 24 coaxially aligned with collar 20 which collars cooperate in shaping insulation 14 into tubular form to be drawn through the heat sealer 22 with casing 16 in surrounding relation to the insulation 14 and inner central core 13.

Upper conveyor 26 acts jointly with lower conveyor 28 to provide continuous uniform control over duct 12 emerging from heat sealer 22 and to feed duct 12 past a saw 32 of a downstream cutting unit 34. The saw 32 serves to cut duct 12 into desired predetermined lengths to be conveyed downstream onto yet another power operated conveyor 36 positioned adjacent but downstream of cutting unit 34. The conveyor 36 is aligned with lower conveyor 28 at a corresponding level to smoothly receive finished, sealed duct 12 as it moves past cutting unit 34.

In accordance with this invention, core 13 is deposited onto insulation 14 by discharge device 10 shown in adjacent upstream relation to the mouth of collar 24, and core 13 is carried by insulation 14 into the machine in timed relation with the passage of insulation 14 and the surrounding casing 16 as the component duct materials pass through collar 20.

In the specifically illustrated embodiment of this invention, the discharge device 10 comprises an open-ended loading unit or tube 30 formed with an arcuate intermediate section connecting opposite linear end sections. End section 30A extends vertically upwardly, and has a suitable mounting bracket 40 shown secured to a fixed extension 42 of the machine frame so as to serve to receive core 13 which is to be discharged or deposited onto insulation 14. The opposite end section 30B extends horizontally and terminates in an exit end through which core 13 is to be discharged. The exit end of loading tube 30 is positioned in coaxially aligned but upstream relation to the collars 20 and 24, and the arcuate intermediate section 30C of tube 30 is engageable with the insulation sheet material shown being trained downwardly over a bar 44, mounted on the machine frame, to be drawn through collar 24. Thus, tube sections 30C and 30B serve as a forming element to pre-form the underlying sheet insulation material into generally U-shaped cross section as insulation 14 is being drawn into the machine before being completely wrapped about core 13. An insulation 14 moves downstream past collar 24, insulation 14 is further shaped into a tubular configuration completely surrounding core 13 before emerging from collar 20 surrounded by the outer casing 16, which is also shaped by collar 20 into tubular form about insulation 14. Loading tube 30 accordingly is located to readily dispense core 13 onto insulation 14 such that insulation 14 and core 13 are fed in synchronism into forming collars 24 and 20 which act to concentrically wrap the insulation 14 and casing 16 about core 13 to form the tubular duct 12.

To provide a conveniently sized discharge device 10 which is particularly suited to discharge extended lengths, say, 25 foot lengths of core 13 which are normally exceedingly awkward to even handle, the loading tube 30 is designed to receive core 13 in longitudinally compressed form. This compressed form of core 13 is readily stored and easily handled in a compact cartridge (as best shown in FIG. 3) and discharge device 10 applies a controlled frictional drag on the core 13 during its withdrawal from tube 30 to insure that the core is deposited in a fully extended condition on the underlying insulation 14.

More specifically, a resilient restraining collar 46 is formed on the exit end of tube 30 with the collar 46 being radially deformable as the core 13 is drawn past the exit end of the discharge device 10. In the specific illustrated embodiment of this invention, collar 46 is a separate onepiece member formed of a suitable resilient material, such as rubber, e.g., having a skirt 48 circumferentially surrounding the exit end of the loading tube 30 and tightly embracing it to mount the collar 46 with a forwardly projecting annular lip 50 of reduced diameter integrally formed with skirt 48 to coaxially extend beyond the exit end of tube 30 to define a discharge opening 52.

The discharge opening 52 is of a predetermined diameter less than the outer diameter of the tubular core 13 when the collar lip 50 is in a normally relaxed condition. The annular lip 50 is uninterrupted and radially expandable to circumferentially engage the core 13 and provide a discharge opening of enlarged diameter, relative to the diameter of the relaxed lip 50, thereby to effect a generally uniform hoop tension to apply a controlled frictional drag to the core 13 during its passage through the exit end of tube 30 to fully extend the core 13 during discharge.

Accordingly it will be seen that during machine setup, the core 13 may be readily loaded in the upper open end of section 30A of tube 30 in a longitudinally compressed tubular cartridge form, and a leading end of the cartridge core may be manually withdrawn through the exit end of loading tube 30 onto insulation 14 a desired distance, preferably through collar 24 and into position adjacent collar 20 before starting the machine. After the machine has been started and insulation 14, casing 16 and core 13 are being automatically drawn into the machine, an operator can observe discharge of the core 13 through a slotted opening 54 formed in a side of the tube 30. While the compressed core within the tube 30 has not been found to exert any substantial spring force tending to extend its trailing end rearwardly through the upper mouth of the tube 30, any such core material could be readily confined in the tube 30 by simply inserting a suitable stop member, if desired, through the opening 54. Obviously cartridges of core of different diameters may be accommodated by providing loading tubes and restraining collars of corresponding diameter sizes for the production of duct of different circumferential size.

The discharge device 10 of this invention not only provides a quick and easy means of discharging core into an associated duct making machine but insures that the core to be discharged may be supplied in an exceedingly compact, easily handled cartridge form which is later discharged in a fully extended condition in the manufacture of a high quality end product.

As will be apparent to persons skilled in the art, various modifications, adaptations and variations of the foregoing specific disclosure can be made without departing from the teachings of this invention.

I claim:

1. In a machine for making duct having an outer layer of sheet material and an inner reinforcement of radially self-sustaining tubular core of a given outside diameter which core is supplied in a longitudinally compressed cartridge of a given length shorter than the fully extended length of the core, an apparatus comprising means for drawing a layer of sheet material into the machine, and a core discharge device having a cartridge loading end, an opposite exit end and a collar on the exit end, the collar being a resilient restraining collar which, in a normally relaxed condition, defines a discharge opening of a diameter less than the given outside diameter of the core, the collar being radially expandable to form a discharge opening of enlarged diameter relative to its relaxed diameter to effect a controlled frictional drag during core withdrawal from the discharge device to insure that the core is deposited in its fully extended length onto the layer of sheet material to be drawn therewith into the machine.

2. The apparatus of claim 1 wherein the discharge device comprises a loading tube, wherein the restraining collar is a separate annular member mounted on an exit end of the loading tube, and wherein the annular end of the collar comprises an uninterrupted annular lip engageable with the core for uniform circumferential engagement with the core during its passage through the exit end of the tube.

3. The apparatus of claim 1 wherein the distance between opposite ends of the discharge device is greater than the length of the cartridge of compressed core such that the cartridge is received in its entirety within the discharge device upon being loaded therein.

4. The apparatus of claim 1 wherein the discharge device comprises a tube with the collar being on an exit end of the tube, the tube itself serving as a forming element to perform the sheet material into generally U-shaped cross section as it is being drawn by said means toward the machine below the tube and before being wrapped about the core.

* * * * *